United States Patent
Zhu

(10) Patent No.: US 12,273,276 B2
(45) Date of Patent: Apr. 8, 2025

(54) PORT RESOURCE RESERVATION METHOD, ELECTRONIC DEVICE, AND STORAGE MEDIUM

(71) Applicant: ZTE CORPORATION, Shenzhen (CN)

(72) Inventor: Xiangyang Zhu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 402 days.

(21) Appl. No.: 17/759,888

(22) PCT Filed: Jan. 5, 2021

(86) PCT No.: PCT/CN2021/070267
§ 371 (c)(1),
(2) Date: Aug. 1, 2022

(87) PCT Pub. No.: WO2021/208529
PCT Pub. Date: Oct. 21, 2021

(65) Prior Publication Data
US 2023/0083406 A1   Mar. 16, 2023

(30) Foreign Application Priority Data
Apr. 13, 2020  (CN) .......................... 202010286428.2

(51) Int. Cl.
*H04L 47/6275*  (2022.01)
(52) U.S. Cl.
CPC .................. *H04L 47/6275* (2013.01)
(58) Field of Classification Search
CPC .................................... H04L 47/6275
See application file for complete search history.

(56) References Cited

U.S. PATENT DOCUMENTS 9,894,124 B2 *  2/2018 Olsen ...................... H04L 65/60
11,159,445 B1 * 10/2021 Subramanian ...... H04L 47/2416
(Continued)

FOREIGN PATENT DOCUMENTS

CN   101841456 A    9/2010
CN   104243628 A   12/2014
(Continued)

OTHER PUBLICATIONS

IEEE P802.1Qci/D2.1, "Bridges and Bridged Networks—Amendment: Per-Stream Filtering and Policing", 802.1Qci/D2.1, Nov. 2016 (Nov. 15, 2016), pp. 1-62.
(Continued)

*Primary Examiner* — Melanie Jagannathan
(74) *Attorney, Agent, or Firm* — Vivacqua Crane, PLLC

(57) ABSTRACT

A port resource reservation method, an electronic device, and a storage medium are disclosed. The method may include, receiving a request message for reserving a resource for traffic, and determining a mode for resource reservation according to the request message; in response to a determination that resource reservation is to be performed in an extended mode, acquiring, according to a predetermined first mapping relationship, an egress port queue corresponding to an extended priority carried in the request message, and performing resource reservation for the traffic on the egress port queue corresponding to the extended priority, wherein the first mapping relationship refers to a mapping relationship between the extended priority and the egress port queue; and acquiring a traffic identifier from the request message, and establishing a second mapping relationship, wherein the second mapping relationship refers to a mapping relationship between the traffic identifier and the extended priority.

17 Claims, 6 Drawing Sheets

(56) References Cited

U.S. PATENT DOCUMENTS

| | | | |
|---|---|---|---|
| 2009/0049175 A1* | 2/2009 | Finn | H04L 12/462 709/226 |
| 2012/0314597 A1* | 12/2012 | Singh | H04L 41/0686 370/252 |
| 2013/0007288 A1* | 1/2013 | Olsen | H04L 65/61 709/227 |
| 2014/0086173 A1* | 3/2014 | Sadeghi | H04W 68/02 370/328 |
| 2016/0036926 A1 | 2/2016 | Gunther | |
| 2017/0331719 A1* | 11/2017 | Park | H04L 45/02 |
| 2019/0058668 A1* | 2/2019 | Gunther | H04L 65/80 |
| 2019/0238441 A1* | 8/2019 | Götz | H04L 12/40 |
| 2019/0253339 A1* | 8/2019 | Mehmedagic | H04L 45/3065 |
| 2019/0386935 A1* | 12/2019 | Back | H04L 49/205 |
| 2020/0228457 A1 | 7/2020 | Chen et al. | |
| 2021/0194819 A1* | 6/2021 | Chen | H04L 47/193 |
| 2021/0400523 A1* | 12/2021 | Munz | H04W 28/0268 |
| 2022/0045939 A1* | 2/2022 | Chen | G05B 19/0428 |
| 2022/0050440 A1* | 2/2022 | Chen | H04L 47/826 |
| 2022/0137604 A1* | 5/2022 | Albrecht | H04L 41/0895 700/28 |
| 2023/0090803 A1* | 3/2023 | Albrecht | H04L 7/0016 370/235 |
| 2023/0379385 A1* | 11/2023 | Mong | H04L 45/66 |

FOREIGN PATENT DOCUMENTS

| | | |
|---|---|---|
| CN | 105191234 A | 12/2015 |
| CN | 108270674 A | 7/2018 |
| CN | 108933739 A | 12/2018 |
| CN | 109246023 A | 1/2019 |
| CN | 110800224 A | 2/2020 |
| EP | 1921803 A1 | 5/2008 |
| IN | 110870285 A | 3/2020 |
| WO | 2014156438 A1 | 10/2014 |
| WO | 2018126473 A1 | 7/2018 |
| WO | 2019214810 A1 | 11/2019 |
| WO | 2020035133 A1 | 2/2020 |

OTHER PUBLICATIONS

The State Intellectual Property Office of People's Republic of China. First Office Action for CN Application No. 202010286428.2 and English translation, mailed Aug. 27, 2024, pp. 1-10.

European Patent Office. Extended European Search Report for EP Application No. 21788443.6, mailed Dec. 23, 2022, pp. 1-7.

IEEE P802.1Qci/D1.2, "Bridges and Bridged Networks—Amendment: Per-Stream Filtering and Policing", 802-IQci-dl-2, Jul. 2016 (Jul. 7, 2016), pp. 1-58.

Lo Bello Lucia et al: "A Perspective on IEEE Time-Sensitive Networking for Industrial Communication and Automation Systems", Proceedings of the IEEE, vol. 107, No. 6, Jun. 2019, pp. 1094-1120.

IEEE Standards Asssociation. "IEEE Standard for Local and Metropolitan Area Networks—Bridges and Bridged Networks Amendment 31: Stream Reservation Protocol (SRP) Enhancements and Performance Improvements," IEEE Computer Society, 2018, pp. 1-208.

International Searching Authority. International Search Report and Written Opinion for PCT Application No. PCT/CN2021/070267 and English translation, mailed Apr. 1, 2021, pp. 1-11.

* cited by examiner

Octet#
1                               7        8
| MAC Address | Unique ID |    StreamID Octet#
9                              15       16
| Destination Address | VLAN_ID |    DataFrameParameters Octet#
17                    19                20
| MaxFrameSize | MaxIntervalFrames |    TSpec Octet#
21
| DataFramePriority(3bits) | Rank | Reserved(4bit) |    PriorityAndRank Octet#
22                    25
| Accumulated Latency |    AccumulatedLatency Octet#
26                              34
| SystemId | Failure Code |    FailureInformation

FIG. 2

Octet#
1                               7        8
| MAC Address | Unique ID |    StreamID Octet#
9                              15       16
| Destination Address | VLAN_ID |    DataFrameParameters Octet#
17                    19                20
| MaxFrameSize | MaxIntervalFrames |    TSpec Octet#
21
| DataFramePriority(3bits) | Rank | Reserved(4bit) |    PriorityAndRank Octet#
22
| Accumulated Latency |    AccumulatedLatency Octet#
26              28
| IPV(16bit) | Indicate(8bit) |    IPVAndIndication Octet#
29                              37
| SystemId | Failure Code |    FailureInformation

FIG. 3

602: Determine a mode for resource reservation mode supported by the target node is determined according to the discovery message, and perform a determination is performed as to whether an extended mode for resource reservation is supported?

PORT RESOURCE RESERVATION METHOD, ELECTRONIC DEVICE, AND STORAGE MEDIUM

CROSS-REFERENCE TO RELATED APPLICATION

This application is a national stage filing under 35 U.S.C. § 371 of international application number PCT/CN2021/070267, filed Jan. 5, 2021, which claims priority to Chinese patent application No. 202010286428.2, filed Apr. 13, 2020. The contents of these applications are incorporated herein by reference in their entirety.

TECHNICAL FIELD

The present disclosure relates to the technical field of communication, in particular to a method, an electronic device, and a non-transitory storage medium for port resource reservation.

BACKGROUND

Growing demand from Internet users for multimedia applications over Ethernet is happening in the field of communication technology, leading to the emergence of various protocols for quality integration services on the Internet. In particular, the IEEE 802.1Qat standard proposed by IEEE provides a network Stream Reservation Protocol (SRP), which is a distributed resource reservation protocol, and is utilized to establish forwarding table and reserve bandwidth resources for the traffic of Time Sensitive Network (TSN). The Talker Advertise message in SRP protocol carries a Data Frame Priority field of 3 bits. During the operation of the protocol, the corresponding egress port queue for reserved resources is found through the mapping relationship between priority and traffic class proposed in IEEE 802.1Qav.

However, the inventors of the present disclosure recognize that, the following situations often occur in the existing technology. The SRP protocol reserves the resources of the egress port queue based on the priority field, and the existing priority field with a length of 3 bits only supports at most 7 classes, that is, the resource reservation can be carried out on at most 7 egress port queues, while the actual TSN service classes are far greater than 7. The egress port queue resources supported by bridge apparatus are not fully utilized by the current SRP protocol in the case that the number of egress port queues supported by bridge apparatus is greater than 8.

SUMMARY

The embodiments of the present disclosure provide a method, an electronic device, and a non-transitory storage medium for port resource reservation, which can provide fine-grained resource allocation services for traffic.

In order to alleviate at least one of the technical problems in the existing technology, an embodiment of the present disclosure provides a method for port resource reservation, which may include, receiving a request message for reserving a resource for traffic, and determining a mode for resource reservation according to the request message; in response to a determination that resource reservation is to be performed in an extended mode, acquiring, according to a predetermined first mapping relationship, an egress port queue corresponding to an extended priority carried in the request message, and performing resource reservation for the traffic on the egress port queue corresponding to the extended priority, wherein the first mapping relationship refers to a mapping relationship between the extended priority and the egress port queue; and acquiring a traffic identifier from the request message, and establishing a second mapping relationship, wherein the second mapping relationship refers to a mapping relationship between the traffic identifier and the extended priority.

An embodiment of the present disclosure further provides an electronic device, which may include at least one processor, and at least one memory that stores an instruction executable by the at least one processor, which when executed by the at least one processor, causes the processor to carry out the method for port resource reservation as described above.

An embodiment of the present disclosure further provides a non-transitory computer-readable storage medium, which stores a computer program, which when executed by a processor, causes the processor to carry out the method for port resource reservation as described above.

BRIEF DESCRIPTION OF DRAWINGS

One or more embodiments are illustrated in conjunction with the corresponding drawings, which do not constitute any limitation of the embodiments. In the drawings:

FIG. 2 depicts a schematic diagram showing a structure of Talker Advertise message in the current SRP protocol according to the first embodiment of the present disclosure;

FIG. 3 depicts a schematic diagram showing a structure of Talker Advertise message in extended SRP protocol according to the first embodiment of the present disclosure;

DETAILED DESCRIPTION

Figure 1:
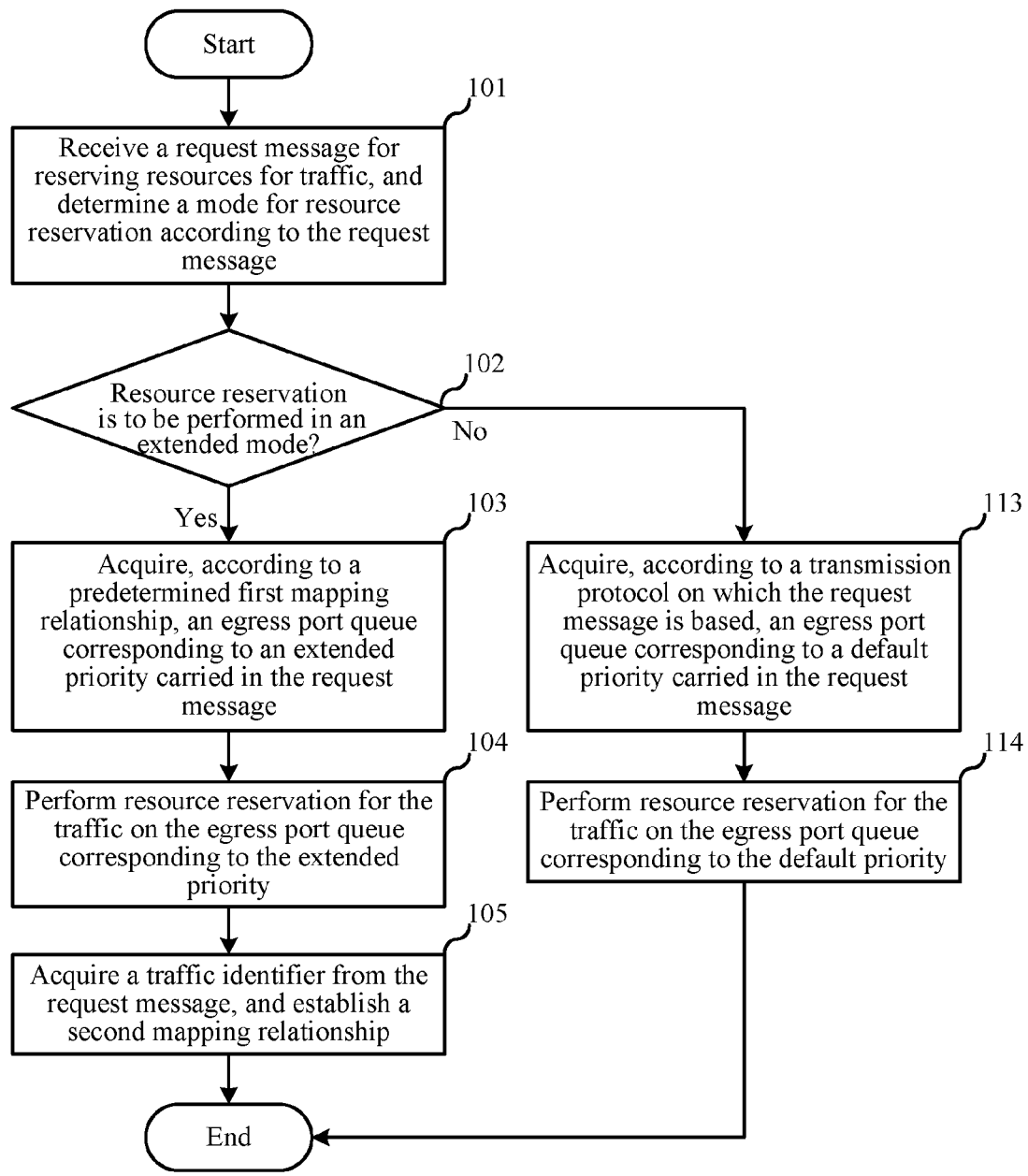
FIG. 1 depicts a flowchart of a port resource reservation method according to a first embodiment of the present disclosure.

The purpose, technical scheme and advantages of the present disclosure will become apparent through the following description for various embodiments in conjunction with the drawings. It should be understood that the embodiments described here are intended for illustration but not limitation of the present disclosure.

It should be noted that although the devices are shown with individual functional modules in the schematic diagram and the logical sequences are shown in the flow chart, in some cases, the devices can have different modules than those shown and the steps can be executed in a different order than those shown. The terms "first" and "second", if used in the description and the drawings are intended to distinguish similar objects, and do not necessarily imply any specific order or sequence. The first embodiment of the present disclosure is directed to a method for reserving port resources, which is performed by a bridge apparatus. In this embodiment, a request message for reserving a resource for traffic is received, and a mode for resource reservation is determined according to the request message; in response to a determination that resource reservation is to be performed in an extended mode, an egress port queue corresponding to an extended priority carried in the request message is acquired according to a predetermined first mapping relationship, and resource reservation is performed for the traffic on the egress port queue corresponding to the extended priority, wherein the first mapping relationship refers to a mapping relationship between the extended priority and the egress port queue; and a traffic identifier is acquired from the request message, and a second mapping relationship is established, wherein the second mapping relationship refers to a mapping relationship between the traffic identifier and the extended priority.

According to the embodiment of the present disclosure, once a request message for reserving resources for traffic is received, if it is determined according to the request message that resources shall be currently reserved with the extended mode, the egress port queue corresponding to the extended priority carried in the request message is found according to the predetermined mapping relationship. Then, the traffic identifier of the traffic is acquired from the request message, and the mapping relationship between the traffic identifier and the extended priority is established. That is, this embodiment provides an extended mode for resource reservation, in which the first mapping relationship between the extended priority and the egress port queue is preset, and the second mapping relationship between the traffic identifier and the extended priority is established for the traffic according to the traffic identifier and the extended priority in the request message. The mapping relationship among the traffic identifier, the extended priority and the egress port queue is established for the traffic through the first mapping relationship and the second mapping relationship. Through this extension, the number of priorities that can be supported in resource allocation can be extended based on the existing packet transmission protocol, so that the egress port queue resources in the network device can be fully utilized to provide fine-grained port resources reservation for messages of traffic.

This embodiment will be further illustrated with reference to the drawings.

As shown in FIG. 1, the port resource reservation method in this embodiment includes the following procedure.

At S101, a request message for reserving a resource for traffic, and a mode for the resource reservation is determined according to the message.

In particular, the port resource reservation method in this embodiment is an extension of the existing resource reservation protocol. The request message is sent by a traffic sender to a subsequent node in the traffic transmission path, and is configured to inform the subsequent node to reserve appropriate bandwidth resources for the traffic to be received. The request message contains data indicating a mode for the resource reservation as the resource reservation protocol is running. In particular, the resource reservation protocol defines two modes for resource reservation, which includes the default mode and the extended mode. After receiving the request message, the subsequent node in the transmission path determines the mode for current resource reservation according to the data in the request message.

In an example, the request message is a Talker Advertise message of the SRP protocol, and the structure of the message is shown in FIG. 2. In the Talker Advertise message, the default priority information is carried by the DataFramePriority field of 3 bits, and can only support at most 8 priorities. During the operation of the protocol, it is necessary to reserve a priority for Best Effort (BE) traffic, so in fact, resource reservation are supported on up to seven egress port queues merely. In this embodiment, the existing field that carries priority information can be extended in various manners including but not limited to, adding a new field of Internal Priority Value (IPV) in the Talker Advertise message, that is, the above-mentioned extended priority, which is of N bit, where N is a natural number greater than three, resulting in the number of supported priorities increased to $2^n$, and the corresponding number of supported egress port queues increased to $2^n-1$.

Upon receiving the extended Talker Advertise message, the network device can determine the mode for current resource reservation according to the value of the IPV field. In particular, the value of the IPV field in the range of 0~7 indicates that the IPV field is invalid, and in such a case, the port resource reservation is performed with the default mode, and the value of IPV field greater than 7 indicates that port resource reservation is performed with the extended mode.

In an example, the resource reservation protocol is the SRP protocol, the request message is the Talker Advertise message, and a third field can be the Reserved field in the Talker Advertise message. The Reserved field is a blank field in the protocol standard, so it can be utilized as a third field to store the relevant data indicating the traffic identifier. In addition, a new Indicate field can be added to the Talker Advertise message as a third field to store the relevant data indicating the traffic identifier. The structure of the extended Talker Advertise message is shown in FIG. 3, in which the newly added message content is located in the line of IPVAndIndication, including the IPV field of 16 bit and the Indicate field of 8 bits.

In one implementation, data of 1-bit can also be utilized as an indicator of the mode for resource reservation, and this data of 1-bit may be stored with 1-bit in the Reserved field or in the newly added Indicate field of the Talker Advertise message. For example, in case the first bit of the Reserved field is utilized as the indicator of the mode for resource reservation, and the value of this bit being "0" indicates that resource reservation shall be performed with the default mode as specified in the protocol, and the value of this bit being "1" indicates that resource reservation shall be performed with the extended mode.

In this embodiment, a first field indicative of the mode for resource reservation and a second field indicative of the extended priority are preset in the request message. That is, the first field is dedicated to indication of the mode for resource reservation, and the second field is dedicated to indication of the extended priority. The information of mode for resource reservation and the information of extended priority is carried in new fields of the request message, such that resource reservation can be performed in the extended mode as proposed in the present disclosure without affecting the transmission of the request message and resource reservation with the existing transmission protocol. And the resource reservation as proposed is easy and flexible to carry out due to its compatibility with the existing transmission protocols.

In addition, the request message is the Talker Advertise message, and the third field is the Reserved field. In the application scenario of SRP protocol, the Reserved field or the newly added Indicate field in the Talker Advertise message carries the first field that is indicative of the mode for resource reservation and the second field that is indicative of the extended priority, thus reducing the modifications made to the protocol message and improving the compatibility of bridge apparatus with the extended protocol.

At 102, a determination is performed as to whether to perform resource reservation with the extended mode.

S113 and S114 are performed in response to a determination that current resource reservation shall be performed with the default mode according to the message of traffic, and the procedure of resource reservation is consistent with the standardized procedure of the existing resource reservation protocol.

At S113, an egress port queue corresponding to a default priority carried in the request message is acquired according to a transmission protocol on which the request message is based.

In an example, the transmission protocol is the SRP protocol, and the request message carries the default priority information through the DataFramePriority field. The correspondence between the default priority proposed in the protocol and the egress port queue is shown in the following table.

| | Number of available traffic classes | | | | | | |
|---|---|---|---|---|---|---|---|
| Priority | 2 | 3 | 4 | 5 | 6 | 7 | 8 |
| 0(Default) | 0 | 0 | 0 | 0 | 0 | 0 | 1 |
| 1 | 0 | 0 | 0 | 0 | 0 | 0 | 0 |
| 2 | 1 | 1 | 2 | 3 | 4 | 5 | 6 |
| 3 | 1 | 2 | 3 | 4 | 5 | 6 | 7 |
| 4 | 0 | 0 | 1 | 1 | 1 | 1 | 2 |
| 5 | 0 | 0 | 1 | 1 | 1 | 2 | 3 |
| 6 | 0 | 0 | 1 | 2 | 2 | 3 | 4 |
| 7 | 0 | 0 | 1 | 2 | 3 | 4 | 5 |

In practical application, the egress port queue of the reserved resources (Traffic Class) can be determined according to the correspondence in the above table. In addition, the correspondence between the default priority and the egress port queue can also be customized in advance by the user as desired.

At S114, resource reservation is performed for the traffic on the egress port queue corresponding to the default priority.

In an example, the transmission protocol is the SRP protocol, and the request message carries the default priority information through the DataFramePriority field. Once the priority is determined according to the DataFramePriority field, the resource reservation is performed on the egress port queue corresponding to the priority according to the predetermined mapping relationship between the priority and the egress port queue.

S102 is performed once it is determined according to the message of traffic that the current resource reservation is to be performed with the extended mode.

At S103, the egress port queue corresponding to the extended priority carried in the request message is acquired according to the predetermined first mapping relationship.

| IPV | TrafficClass |
|---|---|
| 8 | 5 |
| 9 | 7 |
| 10 | 9 |
| 11 | 10 |
| 12 | 11 |
| 13 | 12 |
| 14 | 13 |

In practical applications, a field with an appropriate length can be set according to the current practical requirements, such as the number of ports of bridge apparatus, or a longer field can be set to be compatible with as many as possible the bridge apparatuses with various port numbers in the same network. An IPV field of 8 bit indicates that the value of the IPV ranges from 0-256. The value of IPV field is read once the Talk Advertise message is acquired. Since it is necessary for the extended IPV field to be compatible with the default priority, when the priority is from 0 to 7, resource reservation is to be performed with the default mode. Therefore, on the basis that resource reservation is performed with the extended mode as described above, the read value of IPV field within 0-7, indicates that the mode for resource reservation and priority are not correct, and the resource reservation fails.

At S104, resource reservation is performed on the egress port queue corresponding to the extended priority.

Specifically, once the egress port queue corresponding to the extended priority is found, the required bandwidth resources are calculated according to the traffic specification carried in the request message, and the bandwidth resources are reserved on the queue.

In an example concerning the SRP protocol, the traffic specification is carried in the Traffic Specification (TSpec) field of the Talker Advertise message which records the stream parameters of the traffic.

At S105, a traffic identifier is acquired from the request message and a second mapping relationship is established.

In particular, the second mapping relationship refers to the mapping relationship between the traffic identifier and the extended priority. Generally, in the existing technology, the priority field in the message of traffic (such as PCP field in TSN message) is directly utilized to match the message of traffic with the priority, so once the message of traffic is acquired, the corresponding egress port queue can be directly determined, and the message of traffic can be placed in the reserved egress port queue. In this embodiment, since the number of priorities supported by the extended priority is larger than the number of priorities number recorded in the priority field in the existing technology, the traffic identifier can be acquired according to the request message. The traffic identifier may include the priority field, and may also include specific traffic information such as VLANID of virtual local area network, target address IP, etc. By combining these pieces of traffic information, a larger number of traffic classes can be identified, so that the traffic can be subdivided with more classes and resource reservation service with fine granularity can be provided.

The establishment of the second mapping relationship between the traffic identifier and the extended priority is to find the priority information corresponding to the message of traffic in the second mapping relationship according to the traffic identifier carried in the message of traffic when the subsequent message of traffic is received, so as to place the message of traffic into the reserved egress port queue and complete the traffic scheduling process.

Furthermore, the traffic identifier is determined by a third field carried in the request message. Firstly, the value of the third field associated with the traffic identifier is extracted from the request message, and then the traffic identifier is acquired according to the value of the third field and the predetermined third mapping relationship. The third mapping relationship refers to the mapping relationship between the value of the third field and the traffic identifier. Through the above means, the mapping relationship between the traffic identifier and the value of the third field is saved in advance locally in the network device for maintenance, so that the traffic identifiers composed of different data can be extracted as needed, the traffic can be flexibly identified, and better resource reservation services can be provided. The length of the third field can be set as required, that is, the third field can be set to be shorter, and the traffic identifier having a relatively larger amount of data can be acquired through the mapping relationship between the traffic identifier and the value of the third field. Thereby, the message length of the request message is shortened, the processing efficiency of the request message is improved, and the overhead of the request message is saved.

In one implementation, the traffic identifier is an X-tuple message composed of field values from messages of traffic with the number of X, where X is a natural number greater than 1. The specific fields that make up the X-tuple in the message of traffic are determined, according to the third mapping relationship and the third field, and each value of the third field corresponds to one field composition of an X-tuple.

In an example, the value of the third field and the field composition of the X-tuple are shown in the following table:

| Value of the third field | The field composition of X-tuple |
| --- | --- |
| 1 | {SrcMac, PCP, DestMulticastMac, VlanID} |
| 2 | {DestMultiCastMac, VlanID, PCP} |
| 3 | {SrcMac, VlanID} |
| ... | ... |

In case that 2nd bit to 4th bit (3 bits in total) of the Reserved field (or Indicate field) are currently utilized to store the relevant data indicating the traffic identifier, there are 8 forms for the content of the X-tuple. A value of 0 indicates that the 3-tuple {sSrcMac, destMulticastMac, VlanID} in the header serves as the TSN traffic identification when searching for the corresponding IPV, and a value of 1 indicates that the X-tuple {SrcMac, PCP, DestMulticastmac, Vlan ID} in the header serves as the TSN service message identification. The X-tuple is {DestMultiCastMac,VlanID, PCP} when the value is 2, and {SrcMac,VlanID} when the value is 3.

Figure 4:
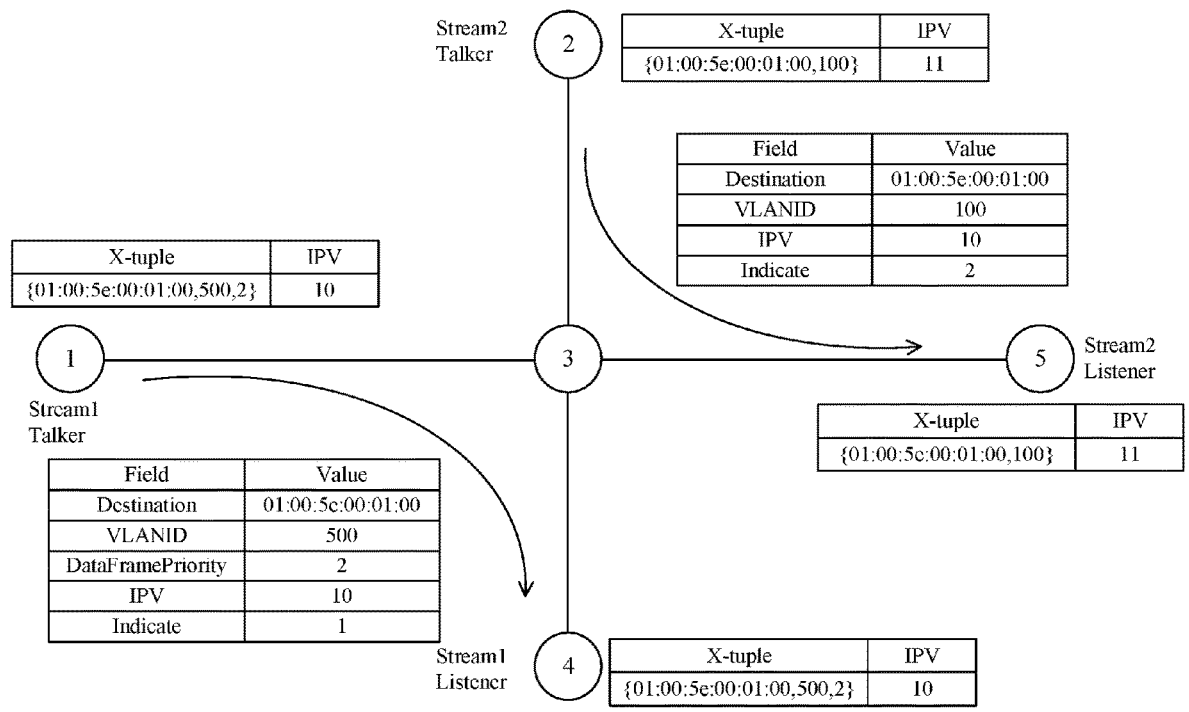
FIG. 4 depicts a schematic diagram showing the establishment of a mapping relationship between X-tuple and IPV by a network device according to the first embodiment of the present disclosure.

Once the X-tuple is determined from the Talker Advertise message, the mapping relationship between the X-tuple and IPV is established. The mapping is particularly shown in FIG. 4.

In particular, node 1 (Stream1Talker) is the node sending traffic No. 1, and sends the Talker Advertise message to node 4 (Stream1Listener) through node 3. The X-tuple carried in the message is {01:00:5e:00:01:00,500,2}({Destination address, VLANID, DataFramePriority}), IPV is 10, and then node 4 establishes the mapping relationship between X-tuple and IPV according to the data in the message. Node 2 (Stream1Talker) is the node sending traffic No. 2, and the X-tuple carried in the message is {01:00:5e:00:01:00,100} ({Destination, VLANID}), and IPV is 11. The talker Talker Advertise message is sent to node 5 (Stream1Listener) through node 3, and then node 4 establishes the mapping relationship between the X-tuple and IPV according to the data in the message. The second mapping relationship between node 4 and node 5 is shown in the figure. Since both the No. 1 traffic and the No. 2 traffic service pass through node 3, the second mapping relationship established by node 3 according to the Talker Advertise messages of the traffic No. 1 and the traffic No. 2 is shown in the following table.

| X-tuple | IPV |
| --- | --- |
| {01:00:5e:00:01:00,500,2} | 10 |
| {01:00:5e:00:01:01,100} | 11 |

In practical application, node 4 or node 5 as described above can maintain the mapping table as shown in the following table, with IEEE 802.1Qci component once the mapping relationship between X-tuple and IPV is established according to the Talker Advertise message.

| Field Name | Value | | |
| --- | --- | --- | --- |
| StreamHandle | {01:00:5e:00:01:00,500.2} | {01:00:5e:00:01:01,100} | ... |
| GateInstanceID | 1 | 2 | ... |
| GateInstanceID | 1 | 2 | ... |
| Gate State | 0 | 0 | ... |
| IPV | 10 | 11 | ... |

Two FilterInstance entries are configured in FilterinstanceTable through SRP extension protocol, with entry IDs of 1 and 2 respectively, and the entry StreamHandle corresponding to FilterInstanceID 1 is {DestMulticastMac, VLANID, PCP}={01: 00: 5e: 00: 01: 00, 500, 2}, the entry StreamHandle corresponding to FilterInstanceID 2 is {DestMulticastMac, VLAN ID}={01: 00: 5e: 00: 01: 01, 100}, and the GateInstanceTable ID corresponding to two FilterInstance entries are 1 and 2, respectively. SRP extension protocol configures two entries with IDs of 1 and 2 in GateInstanceTable. The gate state of the two entries is always "0" and IPV is 10 and 11 respectively. The above configuration shows that the TSN packet whose header matching the entry with FilterInstanceID being 1 is mapped to IPV 10, while the packet matching the entry with FilterInstanceID being 2 is mapped to IPV 11.

It should be noted that the examples as illustrated above in this embodiment are illustrative for convenience of understanding, but are not limiting the present disclosure.

In this embodiment, the existing mode for resource reservation is extended while the original mode for resource reservation is kept. Once a request message for reserving resources for traffic is received, if it is determined according to the request message that resources shall be currently reserved with the extended mode, the egress port queue corresponding to the extended priority carried in the request message is found according to the predetermined mapping relationship. Then, the traffic identifier of the traffic is acquired from the request message, and the mapping relationship between the traffic identifier and the extended priority is established. There is a one-to-one correspondence between the priority and egress port queue, and the number of classes supported by the extended priority is much higher than that in the existing technology, so that the port resources in the bridge apparatus can be fully utilized to provide fine-grained port resource reservation service for messages of various traffic.

Figure 5:
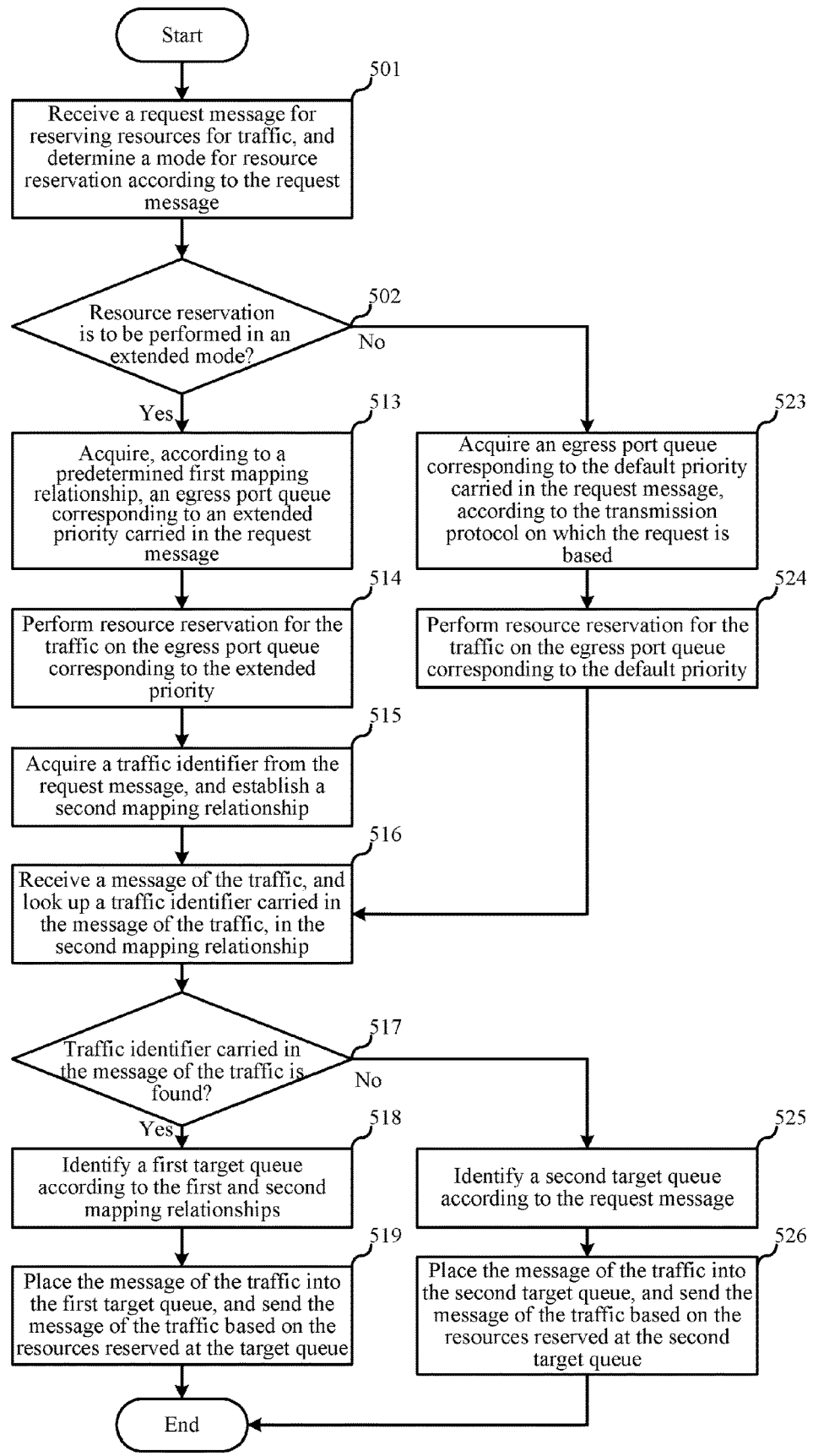
FIG. 5 depicts a flowchart showing a port resource reservation method according to the second embodiment of the present disclosure.

The second embodiment of the present disclosure is directed to a method for port resource reservation, which will be described in detail below with reference to the drawings. As shown in FIG. 5, the port resource reservation method in this embodiment includes the following procedure.

At S501, a request message for reserving resources for traffic is received, and a mode for resource reservation is determined according to the request message.

This process is the same as S101 in the first embodiment of the present disclosure, and the relevant details have been described in the first embodiment of the present disclosure, and will not be repeated here.

At S502, a determination is performed as to whether to perform resource reservation with the extended mode, and S513 to S515 is to be performed in response to a determination that the resource reservation shall be performed with the extended mode.

Specifically, the procedure of resource reservation with the extended mode is starting from S513 to S515. The procedure from S513 to S515 is the same as that from S102 to S104 as described in the first embodiment of the present disclosure, and the relevant details have been described in the first embodiment of the present disclosure, and will not be repeated here.

S523 and S524 are to be performed in response to a determination that resource reservation shall be performed with the default mode.

At S523, an egress port queue corresponding to the default priority carried in the request message is acquired, according to the transmission protocol on which the request is based.

At S524, resource reservation for the traffic is performed on the egress port queue corresponding to the default priority.

At S516, a message of the traffic is received, and a traffic identifier carried in the message of the traffic is looked up in the second mapping relationship.

At S517, a determination is performed as to whether the traffic identifier carried in the message of the traffic is found; the finding of traffic identifier carried in the message of the traffic, indicates that resource reservation for the traffic shall be performed with the extended mode, then S518 and S519 are to be performed; and the failure in finding of traffic identifier carried in the message of the traffic, indicates that resource reservation for the traffic shall be performed with the default mode, then S525 and S526 are to be performed.

At S518, a first target queue is identified according to the second mapping relationship and the first mapping relationship.

At S519, the message of the traffic is placed into the first target queue, and the message of the traffic is sent based on the resources reserved at the target queue.

Specifically, in the existing resource reservation protocol, when traffic is transmitted in the network and forwarded from one node to the subsequent node, the sending node will first send a request message to the subsequent node on the traffic forwarding path to instruct the subsequent node to reserve some bandwidth on a port for the traffic. In this embodiment, as the service message reaches a node on which resource reservation has been performed, the node will extract the traffic identifier from the message of the traffic, and then look up the traffic identifier in the second mapping relationship. The presence of the traffic identifier in the second mapping relationship, indicates that resources have been reserved in advance for that traffic with the extended mode, and an extended priority for the traffic is determined according to the second mapping relationship between the traffic identifier and the extended priority, and then the egress port queue corresponding to the extended priority is determined according to the predetermined first mapping relationship, and the message of the traffic is placed into the egress port queue. This embodiment provides a way to find the corresponding egress port queue for the received message of traffic once resources have been reserved in the egress port queue based on the extended mode. That is, the traffic identifier is preset in the message of the traffic, so that the egress port queue can be determined for the message of the traffic according to the first mapping relationship and the second mapping relationship. Priorities with an increased number can correspond to more egress port queues, thus improving the utilization efficiency of port resources.

In an example, the message of the traffic is the TSN message, and the traffic identifier is the X-tuple extracted in S104 as described in the first embodiment of the present disclosure. The TSN message also carries a plurality of fields in the X-tuple, which are located at the beginning of the message, i.e., the header. Therefore, after receiving the TSN message, the network device will first find out whether the value of the header carried in the TSN message is presented in the second mapping relationship, i.e., the second mapping relationship between X-tuple and IPV priorities. If the value of the header carried in the TSN message presents, the IPV priority corresponding to the X-tuple is determined according to the second mapping relationship, then an egress port queue for reserved resources is further determined according to the mapping relationship between IPV priority and egress port queue, and the TSN message is placed into the egress port queue for sending.

At S525: a second target queue is identified according to the message of the traffic.

At S526: the message of the traffic is placed into the second target queue, and the message of the traffic is sent based on the resources reserved at the second target queue.

Specifically, the failure in finding the traffic identifier carried in the message of the traffic, indicates that the resource reservation is to be performed for the traffic based on the default mode, and then the egress port queue corresponding to the priority field is directly determined according to the field carrying priority information in the message of the traffic.

In an example, there are 9 traffic flows in the current TSN network environment, as shown in the following table.

| StreamID | Traffic type | Class_Measure_Interval | Upper bound requirement of delay |
|---|---|---|---|
| 1 | ISOchronous-Cyclic real-time | 5 us | 1 ms |

| StreamID | Traffic type | Class_Measure_Interval | Upper bound requirement of delay |
|---|---|---|---|
| 2 | Cyclic real-time | 10 us | 2 ms |
| 3 | Network control | 15 us | 3 ms |
| 4 | Audio/video | 125 us | 50 ms |
| 5 | brownfield | 200 us | 100 ms |
| 6 | Alarms/events | 300 us | 10 ms |
| 7 | Configuration/diagnostics | 100 us | 5 ms |
| 8 | Internal/pass-through | 500 us | 10 ms |
| 9 | Best-effort | N/A | N/A |

And each network device runs the SRP protocol. Each traffic has a distinct traffic type, class_measure_interval, and upper bound of delay. Traffic flows of No. 1-8 are deterministic traffic, which shall be allocated with bandwidth by SRP protocol. These eight types of traffic flows have different requirements for network service quality and service level.

If the current SRP protocol is adopted, these eight types of traffic flows will be assigned to the same SR Class and priority to provide services. However, the current SRP protocol only supports up to seven types of SR Classes, which means that at least two traffic flows are to be forcibly classified into the same priority to provide services. For example, the DataFramePriority of the traffic flows of No. 7 and No. 8 is 7, as shown in the following table.

| StreamID | SR ClassID | DataFramePriority |
|---|---|---|
| 1 | A | 2 |
| 2 | B | 3 |
| 3 | C | 1 |
| 4 | D | 4 |
| 5 | E | 5 |
| 6 | F | 6 |
| 7 | G | (7) |
| 8 | G | (7) |
| 9 | N/A | N/A |

If the extended SRP protocol proposed in this embodiment is adopted, after receiving the Talker Advertise message of the traffic flow, each network device or each network node will reserve resources according to the IPV field added in the message, so that each traffic with different network service requirements can be assigned its own SR Class and internal priority IPV, thus providing finer-grained services, as shown in the following table.

| StreamID | SR ClassID | IPV | TrafficClass |
|---|---|---|---|
| 1 | 8 | 8 | 8 |
| 2 | 9 | 9 | 9 |
| 3 | 10 | 10 | 10 |
| 4 | 11 | 11 | 11 |
| 5 | 12 | 12 | 12 |
| 6 | 13 | 13 | 13 |
| 7 | 14 | 14 | 14 |
| 8 | 15 | 15 | 15 |
| 9 | N/A | N/A | 16 |

StreamID is the traffic number, SR ClassID is the priority identifier, IPV is the extended priority, and TrafficClass is the corresponding egress port queue number for resource reservation.

The processes of the above methods are divided only for clarity of description, and can be combined into one single process or some processes can be divided into several processes, any process in which identical logical relationship to the present disclosure is included shall be within the scope of the present disclosure. The algorithm or process with any minor modifications or insignificant designs which do not change the core design of the algorithm and process, shall be within the scope of the present disclosure.

In this embodiment, the extended mode for resource reservation can be compatible with the default mode for resource reservation in the existing technology, and the proper port resource reservation service can still be provided when the request message carrying the default priority is received. When receiving the message of the traffic, the network device first looks for the egress port queue according to the traffic identifier in the message of the traffic, and once the egress port queue is found based on the traffic identifier in the message of the traffic, the message of the traffic is sent according to the egress port queue corresponding to the default priority. This embodiment provides a way to find the egress port queue for reserved resources for messages of traffic, and the messages of traffic for default mode or extended mode for resource reservation can be sent via this device.

The third embodiment of the present disclosure is directed to a method for port resource reservation, which is generally the same as the second embodiment of the present disclosure. The difference lies in that in this embodiment, the structure of the request message and the mode of service resource reservation are extended, and meanwhile, the basis of resource reservation, that is, the discovery message in network domain boundary discovery is extended, but this extension does not affect the specific operating process of domain boundary discovery.

This embodiment will be further illustrated with reference to the drawings.

Figure 6:
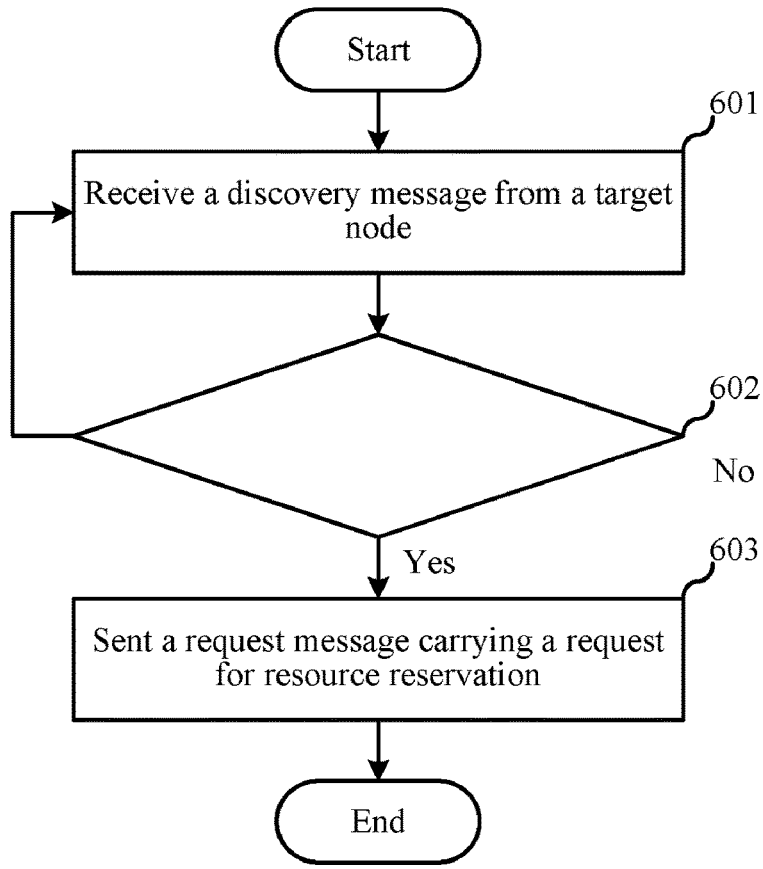
FIG. 6 depicts a flowchart showing a port resource reservation method according to the third embodiment of the present disclosure.

The domain boundary discovery process in this embodiment is shown in FIG. 6, and specifically includes the following procedure.

At S601, a discovery message is received from a target node.

Specifically, the discovery message from the target node carries the priority number and the number of port queues supported by the target node, and a node in the network that will send the traffic will determine whether to send the traffic to the target node according to the discovery message from the target node.

At S602, a mode for resource reservation mode supported by the target node is determined according to the discovery message, and a determination is performed as to whether an extended mode for resource reservation is supported. S603 is to be performed in response to a determination that the extended mode for resource reservation is supported; and S601 is to be performed in response to a determination that the extended mode for resource reservation is not supported, to receive a discovery message from the target node.

Specifically, resource reservation with extended mode can support more types of priorities and greater numbers of port queues. Once a node that supports resource reservation with extended mode sends a message of traffic, it is necessary for the node to determine as to whether the subsequent node on the transmission path, i.e., the target node, supports resource reservation with extended mode. If the target node supports resource reservation with extended mode, the node sending the traffic will send a request message with a resource reservation request to the target node. If that target node does not support resource reservation with extended mode, the node sending the traffic will continue to accept discovery messages from other target nodes. Through the above means, the discovery message is also extended, so that it is possible to determine as to whether the target node supports resource reservation with the extended mode through the discovery message, and any modification to the standardized flow of the existing resource reservation protocol is avoided.

Furthermore, once the discovery message is acquired from the target node, a fourth field indicative of the number of priority classes supported by the target node is first extracted from the discovery message. Then, the length of the fourth field is compared with the length of the second field in the request message. Since the maximum value that a field can indicate in the message is limited by the bit length of the field, the maximum number of priorities that can be indicated in the discovery message and the number of classes of priorities in the second field can be compared according to the length of the field. That is, the length of the fourth field greater than or equal to the length of the second field, indicates that the target node supports resource reservation with the extended mode; and the length of the fourth field less than the length of the second field, indicates that the target node does not support resource reservation with the extended mode. The length of the field recording the number of supported priorities in the discovery message is extended, so that the length of the field carrying the number of priorities in the discovery message is consistent with the length of the field carrying the extended priority in the request message, and the existing protocol procedure can be adopted to discover the mode for resource reservation supported by the node.

Figure 7:
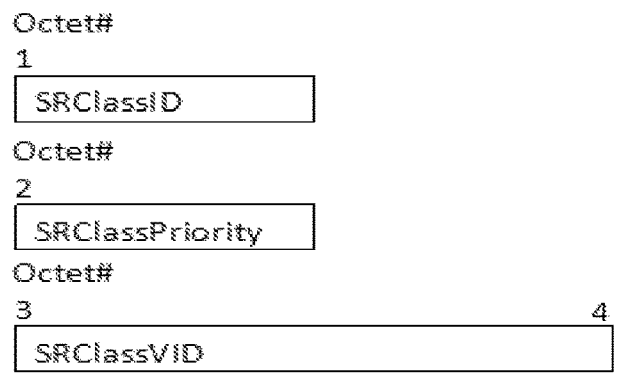
FIG. 7 depicts a schematic diagram showing a structure of a Domain Discovery message in the current SRP protocol according to the third embodiment of the present disclosure.
Figure 8:
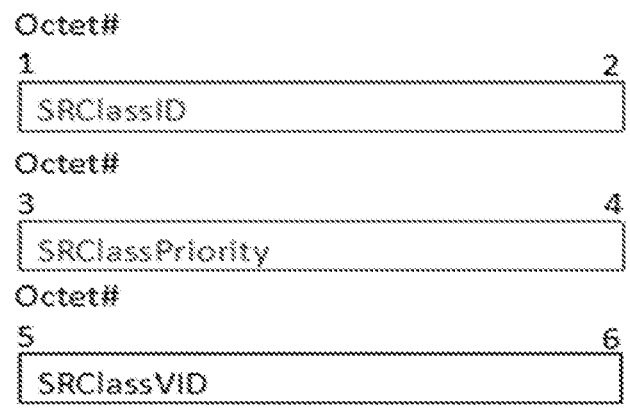
FIG. 8 depicts a schematic diagram showing a structure of a Domain Discovery message in the extended SRP protocol according to the fourth embodiment of the present disclosure.

In one implementation, the Domain Discovery message for domain boundary detection in SRP protocol is shown as an example, the structure of the Domain Discovery message in the existing technology is shown in FIG. 7, and the structure of the extended Domain Discovery message is shown in FIG. 8. In the Domain Discovery message before the extension, both the SRClassID and SRClassPriority fields are of 8 bit, which indicates that the Domain Discovery message can represent at most 256 priorities. In order to match the length of IPV field as described in the first embodiment of the present disclosure, the lengths of SRClassID and SRClassPriority fields in the extended Domain Discovery message are both extended to 16 bit, to support the same number of priorities that the IPV field can support.

The relevant technical details as described in the first embodiment and the second embodiment can be applied to this embodiment, and the technical effects achieved in the second embodiment can also be achieved in this embodiment. In order to reduce redundancy, they will not be repeated here. Accordingly, the relevant technical details as described in this embodiment can also be applied to the first embodiment and the second embodiment.

Figure 9:
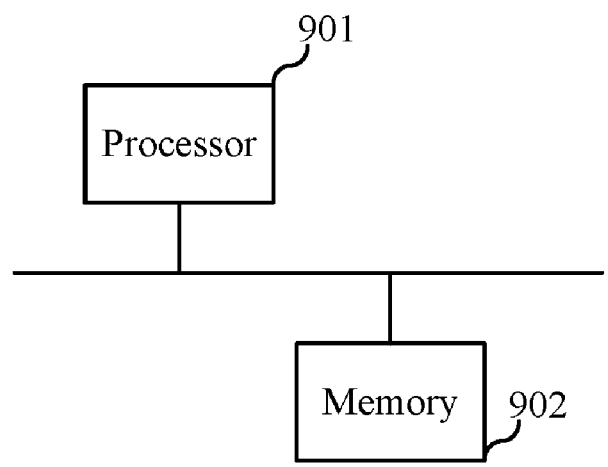
FIG. 9 depicts a schematic diagram of an electronic device according to the fifth embodiment of the present disclosure.

The fourth embodiment of the present disclosure relates to an electronic device, as shown in FIG. 9, which includes at least one processor 901 and at least one memory 902, wherein the memory 902 stores an instruction executable by the at least one processor 901, and when the instruction is executed by the at least one processor 901, causes the at least one processor 901 to perform the port resource reservation method as described in the first, second or third embodiments.

The memory 902 and the processor 901 are connected by a bus. The bus can include any number of interconnected buses and bridges, and the bus connects various circuits of one or more processors 901 and the memory 902 together. The bus can also connect various other circuits, such as peripheral devices, voltage regulators, power management circuits, etc., all of which are well known in the art, so they will not be further described here. The bus interface provides an interface between the bus and the transceiver. The transceiver can be one element or a plurality of elements, such as a plurality of receivers and transmitters, providing a unit for communicating with various other devices over a transmission medium. The data processed by the processor 901 is transmitted over the wireless medium through the antenna. Furthermore, the antenna also receives the data and transmits it to the processor 901.

The processor 901 is configured for managing the bus and general processing, and can also provide various functions, including timing, peripheral interface, voltage regulation, power management and other control functions. And the memory 902 can be utilized to store data for the processor 901 during operations.

The fifth embodiment of the present disclosure relates to a non-transitory computer readable storage medium in which a computer program is stored. The computer program, when is executed by a processor, causes the processor to carry out the method in any one of the embodiments as described above.

That is, it shall be appreciated by those having ordinary skill in the art that all or part of the processes for carrying out the above-mentioned method embodiments can be implemented by instructing related hardware through a program, which is stored in a non-transitory storage medium and includes several instructions to cause a device (such as a single chip, a chip, etc.) or a processor perform all or part of the processes of the methods in various embodiments of the present disclosure. The aforementioned storage media include: U disk (flash disk), mobile hard disk, Read-Only Memory (ROM), Random Access Memory (RAM), magnetic disk or optical disk and other media that can store program codes.

It shall be understood by those having ordinary skill in the art that the above are some embodiments for implementing the present disclosure, and in practical application, various alternations in form and details can be made without departing from the scope of the present disclosure.

What is claimed is:

1. A method for port resource reservation comprising,
receiving a request message for reserving a resource for traffic, and determining a mode for resource reservation according to the request message;
in response to a determination that resource reservation is to be performed in an extended mode, acquiring, according to a predetermined first mapping relationship, an egress port queue corresponding to an extended priority carried in the request message, and performing resource reservation for the traffic on the egress port queue corresponding to the extended priority, wherein the first mapping relationship refers to a mapping relationship between the extended priority and the egress port queue; and
acquiring a traffic identifier from the request message, and establishing a second mapping relationship, wherein the second mapping relationship refers to a mapping relationship between the traffic identifier and the extended priority;
wherein, the request message is preset with a first field indicative of the mode for resource reservation and a second field indicative of the extended priority.

2. The method of claim 1, wherein subsequent to the acquiring of the traffic identifier from the request message and the establishing of the second mapping relationship, the method further comprises, receiving a message of the traffic, and looking up in the second mapping relationship, a traffic identifier carried in the message of the traffic;

in response to a finding of the traffic identifier carried in the service message, in the second mapping relationship, acquiring a first target queue according to the second mapping relationship and the first mapping relationship, wherein the first target queue refers to an egress port queue corresponding to the traffic identifier carried in the message of the traffic; and placing the message of the traffic into the first target queue, and sending the message of the traffic based on a resource reserved at the first target queue.

3. The method of claim 2, wherein, subsequent to the determining of a mode for resource reservation according to the request message, the method further comprises, in response to a determination that resource reservation is to be performed with a default mode, acquiring, according to a transmission protocol on which the request message is based, an egress port queue corresponding to a default priority carried in the request message, and performing resource reservation for the traffic on the egress port queue corresponding to the default priority; and wherein, subsequent to the looking up of the traffic identifier carried in the message of the traffic in the second mapping relationship, the method further comprises, in response to a failure in finding the traffic identifier carried in the message of the traffic, in the second mapping relationship, acquiring, a second target queue according to a transmission protocol on which the request message is based, wherein the second target queue refers to an egress port queue corresponding to the default priority carried in the message of the traffic; and placing the message of the traffic into the second target queue, and sending the message of the traffic based on a resource reserved at the second target queue.

4. The method of claim 1, wherein the acquiring of the traffic identifier from the request message comprises, extracting a value of a third field associated with the traffic identifier from the request message; and acquiring the traffic identifier according to the value of the third field and a predetermined third mapping relationship, wherein the third mapping relationship refers to a mapping relationship between the value of the third field and the traffic identifier.

5. The method of claim 4, wherein, the request message is a Talker Advertise message, and the third field is a Reserved field.

6. The method of claim 2, wherein, prior to the placing of the message of the traffic into the first target queue, and sending of the message of the traffic based on the resource reserved at the first target queue, the method further comprises, receiving a discovery message from a target node, and determining a mode for resource reservation supported by the target node according to the discovery message;

in response to the mode for resource reservation mode supported by the target node comprising the extended mode, sending the request message to the target node; and placing the message of the traffic into the first target queue and sending the message of the traffic based on the resource reserved at the first target queue, wherein the message of the traffic is placed into the first target queue and sent to the target node based on the resource reserved at the first target queue.

7. The method of claim 6, wherein the determining of the mode for resource reservation supported by the target node according to the discovery message comprises, determining the mode for resource reservation supported by the target node according to a length of a fourth field in the discovery message;

wherein the fourth field is a field indicative of a number of priorities supported by the target node, or the fourth field is a field indicative of a plurality of traffic classes supported by the target node;

wherein, a number of the plurality of traffic classes is identical to the number of priorities, and each of the plurality of traffic classes corresponds to a respective one of the priorities.

8. A network device comprising, at least one processor; and, at least one memory;

wherein the memory stores an instruction executable by the at least one processor, which when are executed by the at least one processor, causes the at least one processor to carry out a method for port resource reservation comprising, receiving a request message for reserving a resource for traffic, and determining a mode for resource reservation according to the request message;

in response to a determination that resource reservation is to be performed in an extended mode, acquiring, according to a predetermined first mapping relationship, an egress port queue corresponding to an extended priority carried in the request message, and performing resource reservation for the traffic on the egress port queue corresponding to the extended priority, wherein the first mapping relationship refers to a mapping relationship between the extended priority and the egress port queue; and acquiring a traffic identifier from the request message, and establishing a second mapping relationship, wherein the second mapping relationship refers to a mapping relationship between the traffic identifier and the extended priority;

wherein, the request message is preset with a first field indicative of the mode for resource reservation and a second field indicative of the extended priority.

9. A non-transitory computer-readable storage medium storing a computer program, which when executed by a processor, causes the processor to carry out a method for port resource reservation comprising, receiving a request message for reserving a resource for traffic, and determining a mode for resource reservation according to the request message;

in response to a determination that resource reservation is to be performed in an extended mode, acquiring, according to a predetermined first mapping relationship, an egress port queue corresponding to an extended priority carried in the request message, and performing resource reservation for the traffic on the egress port queue corresponding to the extended priority, wherein the first mapping relationship refers to a mapping relationship between the extended priority and the egress port queue; and acquiring a traffic identifier from the request message, and establishing a second mapping relationship, wherein the second mapping relationship refers to a mapping relationship between the traffic identifier and the extended priority;

wherein, the request message is preset with a first field indicative of the mode for resource reservation and a second field indicative of the extended priority.

10. The network device of claim 8, wherein subsequent to the acquiring of the traffic identifier from the request message and the establishing of the second mapping relationship, the method further comprises, receiving a message of the traffic, and looking up in the second mapping relationship, a traffic identifier carried in the message of the traffic;

in response to a finding of the traffic identifier carried in the service message, in the second mapping relationship, acquiring a first target queue according to the second mapping relationship and the first mapping relationship, wherein the first target queue refers to an egress port queue corresponding to the traffic identifier carried in the message of the traffic; and placing the message of the traffic into the first target queue, and sending the message of the traffic based on a resource reserved at the first target queue.

11. The network device of claim 10, wherein, subsequent to the determining of a mode for resource reservation according to the request message, the method further comprises, in response to a determination that resource reservation is to be performed with a default mode, acquiring, according to a transmission protocol on which the request message is based, an egress port queue corresponding to a default priority carried in the request message, and performing resource reservation for the traffic on the egress port queue corresponding to the default priority; and wherein, subsequent to the looking up of the traffic identifier carried in the message of the traffic in the second mapping relationship, the method further comprises, in response to a failure in finding the traffic identifier carried in the message of the traffic, in the second mapping relationship, acquiring, a second target queue according to a transmission protocol on which the request message is based, wherein the second target queue refers to an egress port queue corresponding to the default priority carried in the message of the traffic; and placing the message of the traffic into the second target queue, and sending the message of the traffic based on a resource reserved at the second target queue.

12. The network device of claim 8, wherein the acquiring of the traffic identifier from the request message comprises, extracting a value of a third field associated with the traffic identifier from the request message; and acquiring the traffic identifier according to the value of the third field and a predetermined third mapping relationship, wherein the third mapping relationship refers to a mapping relationship between the value of the third field and the traffic identifier.

13. The network device of claim 12, wherein, the request message is a Talker Advertise message, and the third field is a Reserved field.

14. The non-transitory computer-readable storage medium of claim 9, wherein subsequent to the acquiring of the traffic identifier from the request message and the establishing of the second mapping relationship, the method further comprises, receiving a message of the traffic, and looking up in the second mapping relationship, a traffic identifier carried in the message of the traffic;

in response to a finding of the traffic identifier carried in the service message, in the second mapping relationship, acquiring a first target queue according to the second mapping relationship and the first mapping relationship, wherein the first target queue refers to an egress port queue corresponding to the traffic identifier carried in the message of the traffic; and placing the message of the traffic into the first target queue, and sending the message of the traffic based on a resource reserved at the first target queue.

15. The non-transitory computer-readable storage medium of claim 14, wherein, subsequent to the determining of a mode for resource reservation according to the request message, the method further comprises, in response to a determination that resource reservation is to be performed with a default mode, acquiring, according to a transmission protocol on which the request message is based, an egress port queue corresponding to a default priority carried in the request message, and performing resource reservation for the traffic on the egress port queue corresponding to the default priority; and wherein, subsequent to the looking up of the traffic identifier carried in the message of the traffic in the second mapping relationship, the method further comprises, in response to a failure in finding the traffic identifier carried in the message of the traffic, in the second mapping relationship, acquiring, a second target queue according to a transmission protocol on which the request message is based, wherein the second target queue refers to an egress port queue corresponding to the default priority carried in the message of the traffic; and placing the message of the traffic into the second target queue, and sending the message of the traffic based on a resource reserved at the second target queue.

16. The non-transitory computer-readable storage medium of claim 9, wherein the acquiring of the traffic identifier from the request message comprises, extracting a value of a third field associated with the traffic identifier from the request message; and acquiring the traffic identifier according to the value of the third field and a predetermined third mapping relationship, wherein the third mapping relationship refers to a mapping relationship between the value of the third field and the traffic identifier.

17. The non-transitory computer-readable storage medium of claim 16, wherein, the request message is a Talker Advertise message, and the third field is a Reserved field.

* * * * *